(12) United States Patent
He et al.

(10) Patent No.: US 7,262,904 B1
(45) Date of Patent: Aug. 28, 2007

(54) TUNABLE OPTICAL ADD/DROP DEVICE

(75) Inventors: Chun He, Fremont, CA (US); Frank Wu, Fremont, CA (US); Christine Luochanghong Lee, Sunnyvale, CA (US); Yao Li, Fremont, CA (US); Wei-Shin Tsay, Saratoga, CA (US)

(73) Assignee: Alliance Fiber Optic Products, Inc., Sunnyvale, CA (US)

( * ) Notice: Subject to any disclaimer, the term of this patent is extended or adjusted under 35 U.S.C. 154(b) by 799 days.

(21) Appl. No.: 10/736,008

(22) Filed: Dec. 15, 2003

Related U.S. Application Data (63) Continuation-in-part of application No. 10/144,596, filed on May 10, 2002, now Pat. No. 6,943,938.

(51) Int. Cl.
*H01S 3/00* (2006.01)
*G02B 6/42* (2006.01)
*H04J 14/02* (2006.01)

(52) U.S. Cl. .................. 359/337.2; 385/18; 398/82; 398/85

(58) Field of Classification Search ............. 359/337.2; 385/18; 398/82, 85
See application file for complete search history.

(56) References Cited

U.S. PATENT DOCUMENTS

| | | | | |
|---|---|---|---|---|
| 5,812,291 | A * | 9/1998 | Bendelli et al. ............... | 398/85 |
| 6,748,133 | B2 * | 6/2004 | Liu et al. ........................ | 385/24 |
| 6,839,517 | B2 * | 1/2005 | Anigbo et al. ................. | 398/85 |
| 6,845,187 | B1 * | 1/2005 | Weaver et al. ................. | 385/18 |
| 6,943,938 | B1 * | 9/2005 | Liu et al. ................... | 359/337.2 |

* cited by examiner

*Primary Examiner*—Mark Hellner
(74) *Attorney, Agent, or Firm*—Joe Zheng (57) ABSTRACT

Improved designs of optical devices for processing optical signals with one or more specified wavelengths are disclosed. According to embodiment, a filter mirror assembly appears an "L" shape and provides a filtering function as well as a reflecting function. The filter mirror assembly is so mounted that a rotation thereof will not alter the optical path the beam positions of signals resulted from a rotation of the filter mirror assembly. To cancel or minimize a lateral shift introduced to a light beam going through an optical filter, an optical compensator is introduced and rotates oppositely whenever the optical filter rotates.

18 Claims, 11 Drawing Sheets

TUNABLE OPTICAL ADD/DROP DEVICE

CROSS-REFERENCE TO RELATED APPLICATION

This application is a continuation-in-part of U.S. application Ser. No. 10/144,596, filed May 10, 2002, now U.S. Pat. No. 6,943,938 and entitled "Tunable Wavelength Filter with Invariant Transmission and Reflection Beam Angles," which is hereby incorporated by reference.

BACKGROUND OF THE INVENTION

1. Field of the Invention

The invention is generally related to the area of optical communications. In particular, the invention is related to a method and apparatus for processing optical channel or channel band signals with specified wavelengths, and more particularly, to optical add/drop devices and the method for making the same.

2. The Background of Related Art

The future communication networks demand ever increasing bandwidths and flexibility to different communication protocols. DWDM (Dense Wavelength Division Multiplexing) is one of the key technologies for such optical fiber communication networks. DWDM employs multiple wavelengths or channels in a single fiber to transmit in parallel different communication protocols and bit rates. Transmitting several channels in a single optical fiber at different wavelengths can multi-fold expand the transmission capacity of the existing optical transmission systems, and facilitating many functions in optical networking.

There are many optical parts/devices used in the optical fiber communication networks. Optical tunable filter is one of the optical parts/devices widely used in many important fiber optical applications, such as, optical add/drop modules, optical cross connect systems and tunable receivers. An ideal filter is a device which can isolate an arbitrary spectral band with an arbitrary center wavelength over a broad spectral range. Accordingly, a tunable filter is known or desired to be able to transmit at any given wavelengths with some minor turning adjustments.

There are many ways of making a filter with tuning capability and, consequently, many types of tunable filters. These include those using fiber Bragg grating and tunable acoustical filter (TAOF), traditional interferometers such as Fabry-Perot, and liquid crystal filters. All have advantages and limitations and are ended up with a trade-off among the technical feasibility, the performance demands and costs. On the other hand, it is often needed to select a signal with a particular wavelength from a multiplexed signal with a group of wavelengths. This is advantageous in order to drop/add the same or different channel signals at various points within an optical network. Optical add/drop devices are often employed to add/drop one or more of these channel signals. It is desirable to have tunable filters that have the advantages of simple structure, good performance, high reliability and low cost.

SUMMARY OF THE INVENTION

This section is for the purpose of summarizing some aspects of the present invention and to briefly introduce some preferred embodiments. Simplifications or omissions may be made to avoid obscuring the purpose of the section. Such simplifications or omissions are not intended to limit the scope of the present invention.

The present invention is related to designs of optical devices for processing optical channel or channel band signals with arbitrarily specified wavelengths over a predefined spectral range. According to one aspect of the present invention, an optical filter, such as a thin film filter with a bandpass WDM filter coating on one side and an antireflection (AR) coating on the other side, is integrated with a high-reflective (HR) mirror. Specifically, the optical filter and the mirror are integrated such that the mirror rotates accordingly when the optical filter rotates. The integrated part, also referred to as a filter mirror assembly, is then rotatably mounted around a rotation axis positioned at an intersection of the incident side of the optical filter and the reflecting side of the mirror.

In general, the optical filter has a frequency response of a bandpass filter and the center bandpass frequency depends on an incident angle at which an incoming optical signal impinges upon the filter coating side of the optical filter. As a result, the beam angles of the transmitted signal as well as the reflected optical signal are invariant to the rotation of the filter mirror assembly around the axis, and thus invariant to the incident angle of the incoming signal to the optical filter. By positioning the rotation axis at the intersection, not only the beam angle but the total position of the reflected beam will be invariant to the rotation of the filter-mirror assembly. Therefore, a wide range of wavelengths can be selected to transmit through the optical filter, and kept the reflected signal uninterrupted.

The present invention may be implemented as an apparatus and a method. According to one implementation, the present invention is an optical device comprising an optical filter having an incident side, a frequency response of the optical filter to an incoming signal depending on an incident angle of the incoming signal to the incident side; a mirror having a reflecting side and integrated with the optical filter to form an integrated part rotatably mounted on a rotation axis such that the mirror rotates accordingly when the optical filter is caused to rotate to a position in response to a selected wavelength; and a compensator configured to rotate oppositely with the optical filter to compensate a lateral shift in a light beam passing through the optical filter.

According to another implementation, the present invention is an optical device comprising a filter mirror assembly including an optical filter having an incident side, a frequency response of the optical filter to an incoming signal depending on an incident angle of the incoming signal to the incident side and a mirror having a reflecting side, the filter mirror assembly rotatably mounted on a rotation axis such that the mirror rotates accordingly when the optical filter is caused to rotate to a position to select a wavelength; a first collimator optically coupled to the optical filter; a second collimator optically coupled to the mirror; a third collimator; and an optical compensator optically coupled between the filter mirror assembly and the third collimator, wherein the compensator performs in accordance with the optical filter to cancel or minimize a lateral shift when a light beam goes through either one of the optical compensator and the optical filter.

There are numerous benefits, features, and advantages in the present invention. One of them is a simple structure, good performance, high reliability and low cost in the tunable filters contemplated in the present invention.

Other objects, features, and advantages of the present invention will become apparent upon examining the following detailed description of an embodiment thereof, taken in conjunction with the attached drawings.

BRIEF DESCRIPTION OF THE DRAWINGS

These and other features, aspects, and advantages of the present invention will become better understood with regard to the following description, appended claims, and accompanying drawings where:

DESCRIPTION OF THE PREFERRED EMBODIMENTS

In the following description, numerous specific details are set forth in order to provide a thorough understanding of the present invention. However, it will become obvious to those skilled in the art that the present invention may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the present invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Embodiments of the present invention are discussed herein with reference to FIGS. 1A–5B. However, those skilled in the art will readily appreciate that the detailed description given herein with respect to these figures is for explanatory purposes as the invention extends beyond these limited embodiments.

Figure 1A:
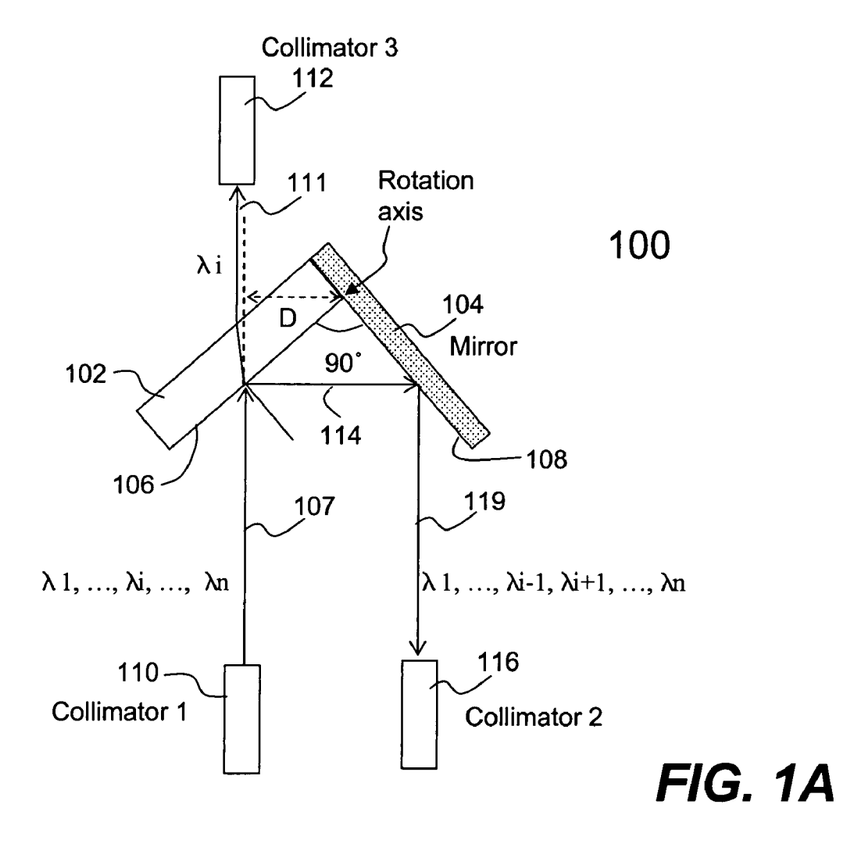
FIG. 1A shows an optical device including an optical filter integrated with a mirror to facilitate the understanding of the present invention.

FIG. 1A shows an optical device 100 that may be used to facilitate the understanding of the present invention. The optical device 100 is capable of maintaining beam direction and angle of both transmission beam and reflection beam while rotating a filter mirror assembly relatively to an incoming optical beam or signal (e.g., a multiplexed signal) with a plurality of wavelengths. The filter mirror assembly includes an optical filter 102 and a mirror 104.

As shown in the figure, the filter mirror assembly appears an "L" shape and provides a filtering function as well as a reflecting function. As will be detailed more below, the angle between the optical filter 102 and the mirror 104 does not have to be a right angle (i.e., 90 degree). The drawing showing a 90 degree is for easy understanding only and shall not be understood as an implied limitation of the current invention.

Figure 1B:
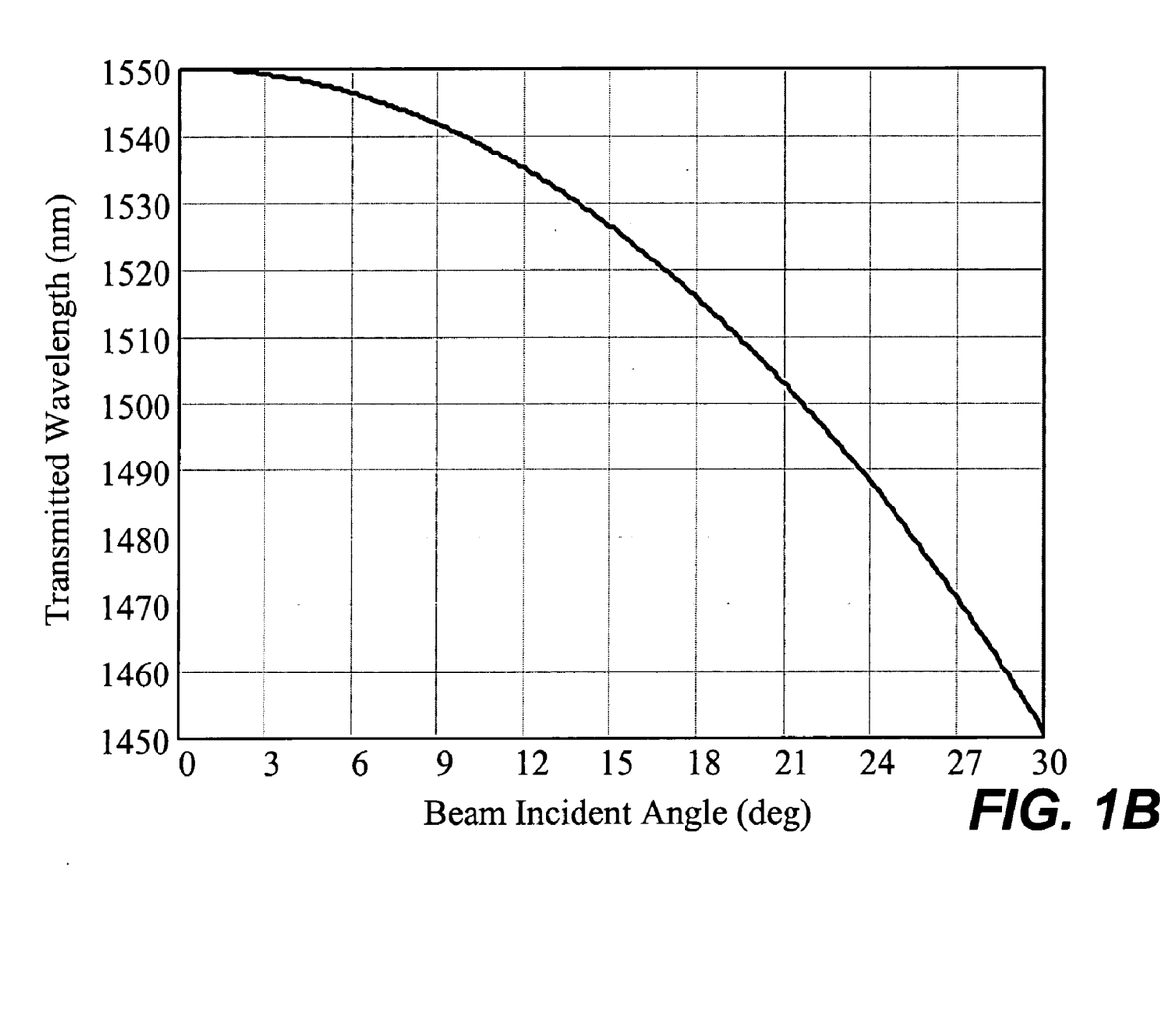
FIG. 1B shows characteristics of an exemplary optical filter.

According to one embodiment, the optical filter 102 is so chosen that the frequency response thereof to an incoming signal depends on an incident angle of the incoming signal coming to its incident side 106 while the mirror is preferably of high reflection. FIG. 1B shows characteristics of an exemplary optical filter. A pass-through wavelength of the optical filter changes when the incident angle changes. For example, at an incident angle of 0 degree, the pass-through wavelength is 1550 nm while, at an incident angle of 27 degree, the pass-through wavelength is 1470 nm.

In general, the optical filter 102 has two sides, preferably, a bandpass WDM filter coating on one side and an antireflection (AR) coating on the other side with both side substantially parallel with each other. Depending on the use of the optical device 100, either side can be an incident side to receive an optical signal. To facilitate the description of the present invention, it is assumed that the optical device 100 is used to drop or filter out a specific (selected) wavelength from an incoming multiplexed signal 107 as shown in FIG. 1A.

In operation, the incoming signal or light beam 107, assumed to have wavelengths $\lambda_1$, (2, ..., and (N, is coupled from a collimator 110 to the optical filter 102. According to a particular requirement, for example, only a signal with wavelength (j $(1 \leq j \leq N)$ is to be transmitted through the optical filter 102 positioned at a particular position (angle), for example, P1, at the same time, the remaining wavelengths in the signal 107 (i.e., the reflected signal 114) are reflected to the mirror 104 that further reflects the reflected signal 114 to a collimator 116.

As a result, the collimator 110 couples in the incoming signal 107 with wavelengths (1, (2, . . . , and (N, the collimator 112 outputs a transmitted signal 111 at a selected wavelength (j and the collimator 116 outputs the reflected signal 114 with all wavelengths except for the selected wavelength (j.

Figure 2:
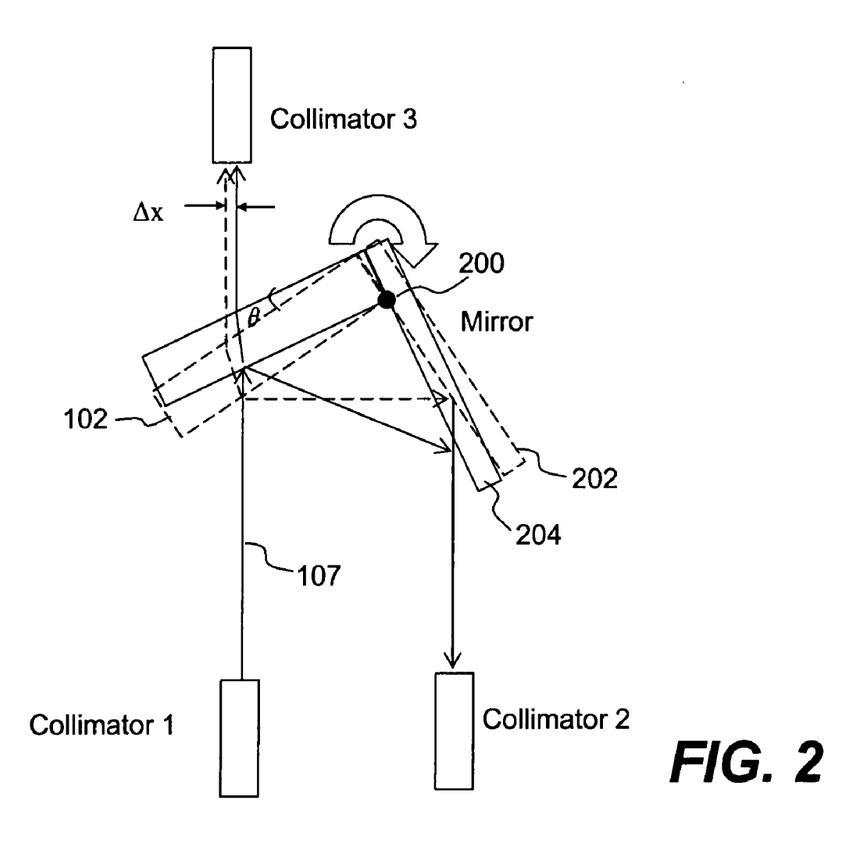
FIG. 2 shows that a filter mirror assembly including an optical filter and a mirror has been rotated around a rotation axis from a position P1 to a new position P2.

When there is a need to alter the selection of the transmitted wavelength (j to (i, wherein $1 \leq i$, $j \leq N$ and i≠j, the filter mirror assembly can be rotated accordingly to a new position, for example, P2. Referring now to FIG. 2, it shows that the integrated optical filter 102 and the mirror 104 have been rotated around a rotation axis 200 from a position P1 202 to a new position P2, 204. Because the incident angle of the signal 107 is changed, only a signal with wavelength $\lambda_j$ is transmitted through the optical filter 102 positioned at the present position, at the same time, the remaining wavelengths in the signal 108 are reflected to the mirror 104 that further reflects the reflected signal 114 to the collimator 116.

Figure 3A:
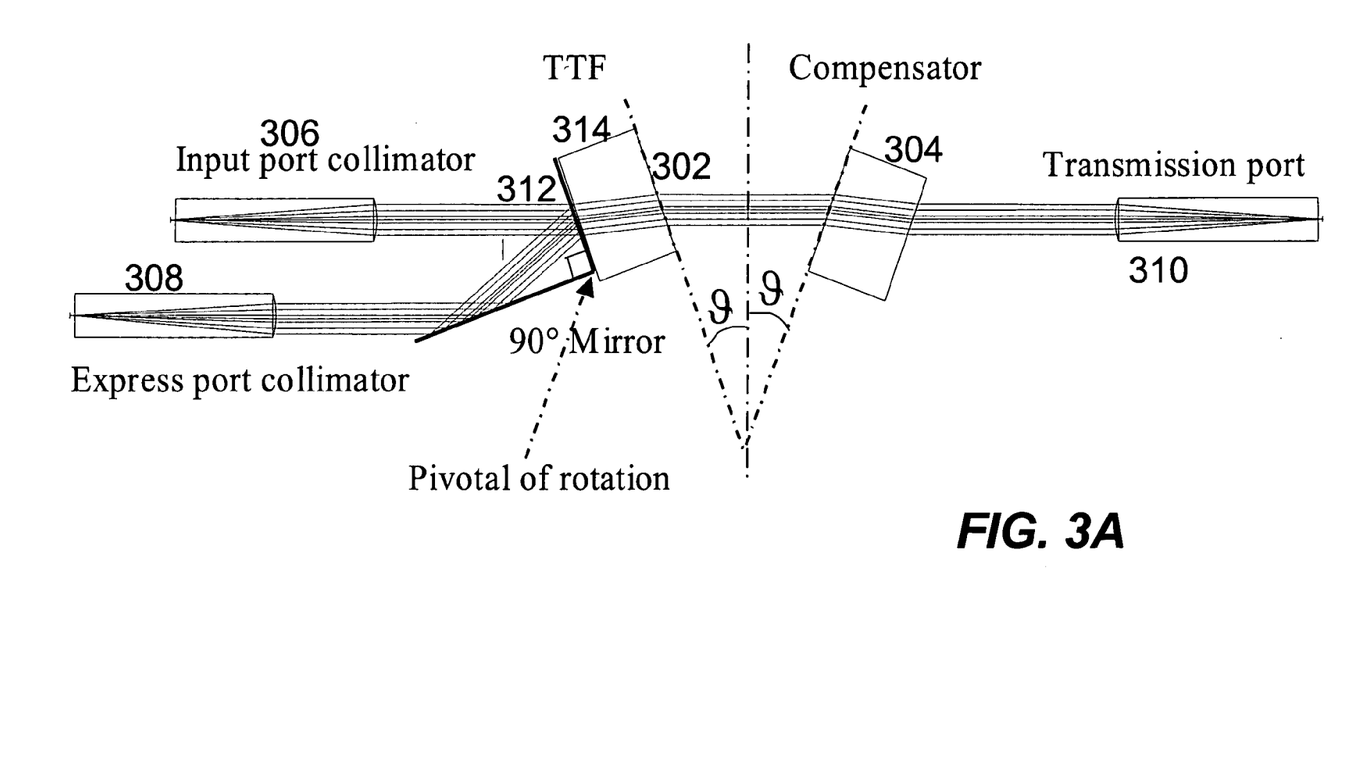
FIG. 3A shows an optical filter according to one embodiment of the present invention.
Figure 3B:
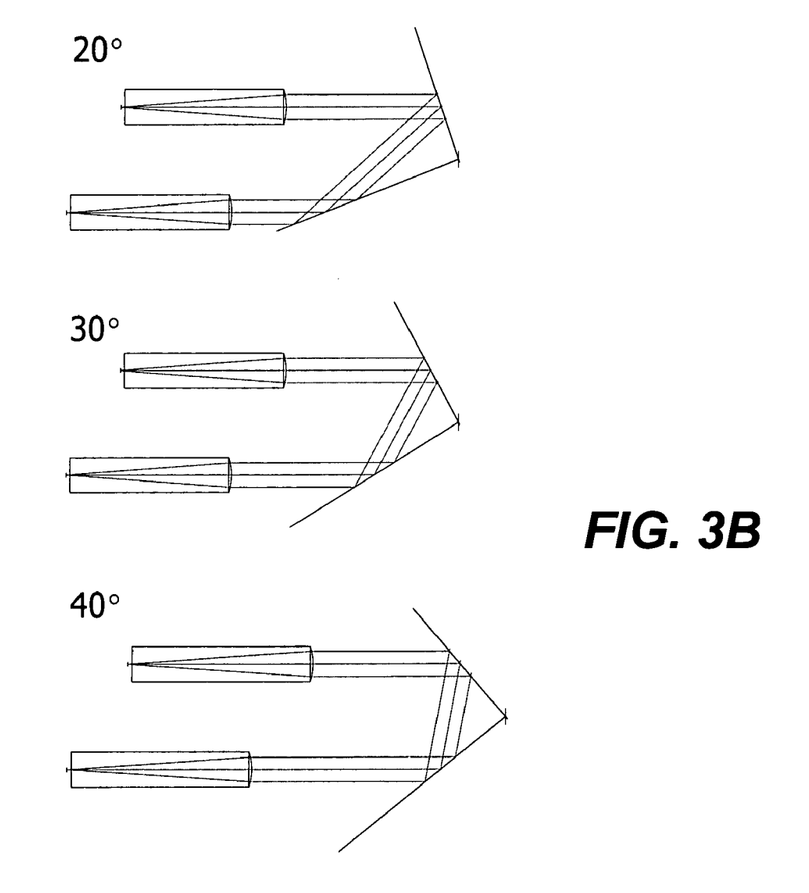
FIG. 3B shows exemplary real tray tracing at three beam incident angles in which the reflected beam and the incident beam are kept the same position when the filter mirror assembly is rotated from 20 to 30 and to 40 degree.
Figure 3C:
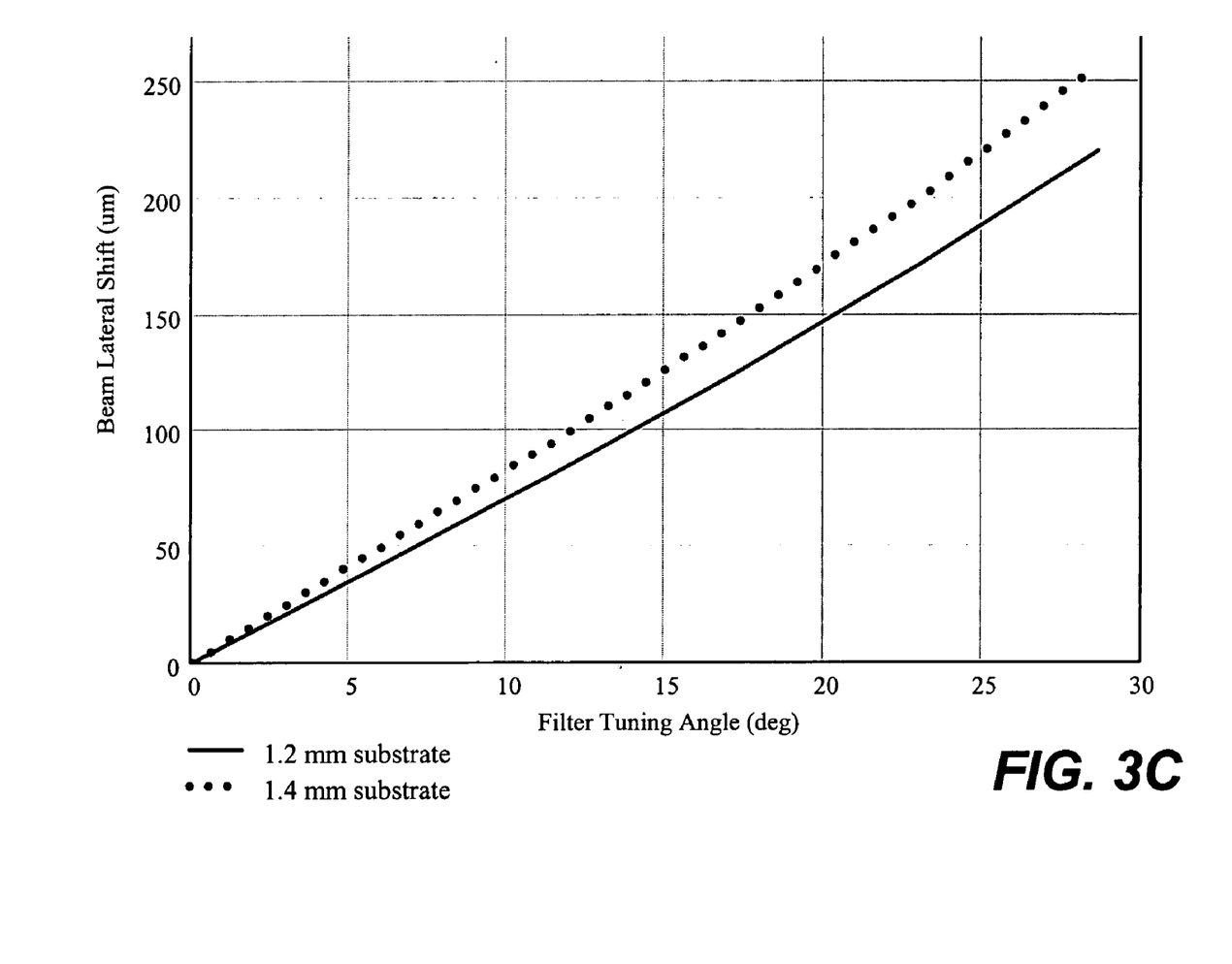
FIG. 3C shows a measurement of a lateral shift versus an incident angle onto the filter mirror assembly.
Figure 3D:
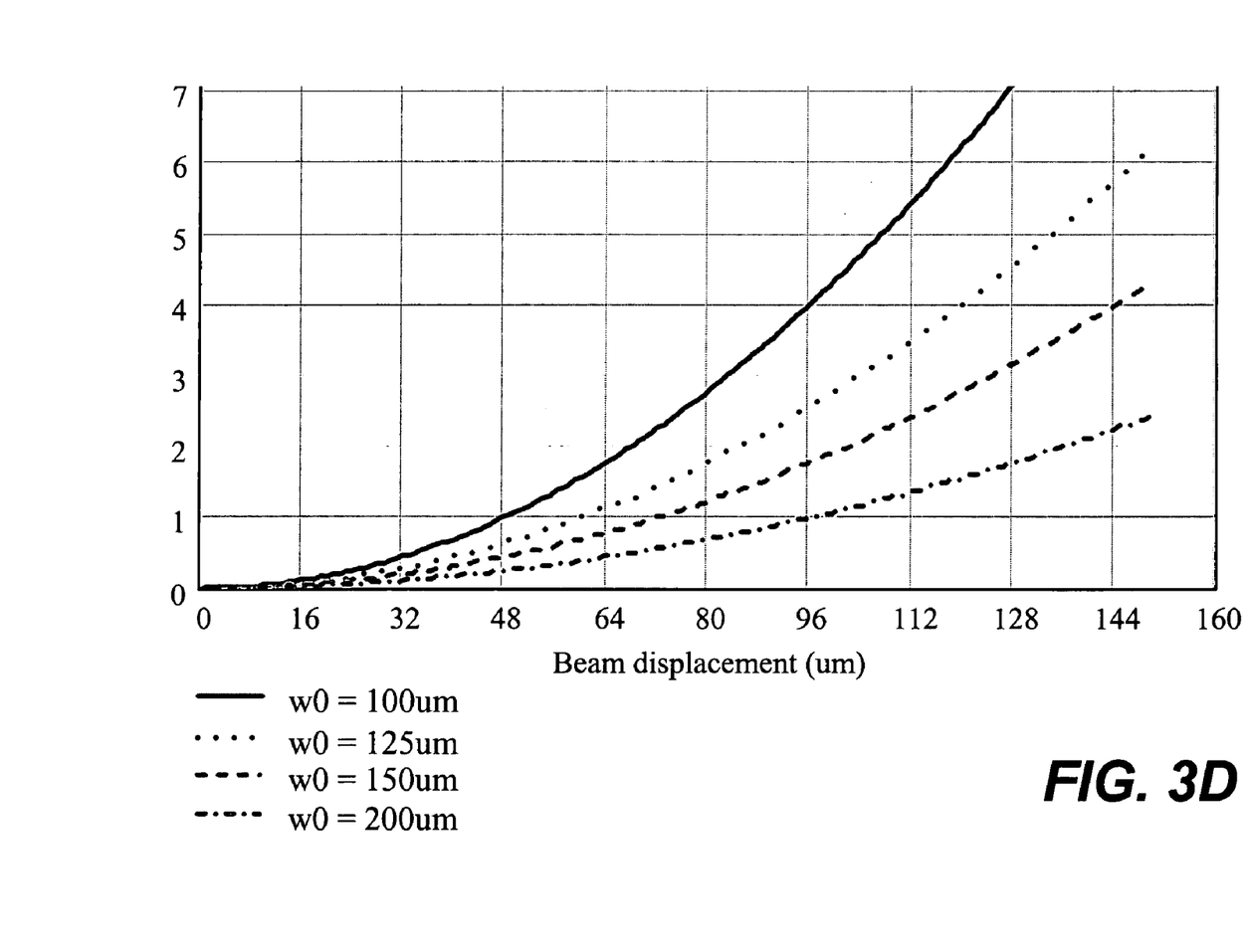
FIG. 3D shows collective measurements of the coupling loss versus the lateral shift Δx for four given collimated beam sizes.
Figure 3E:
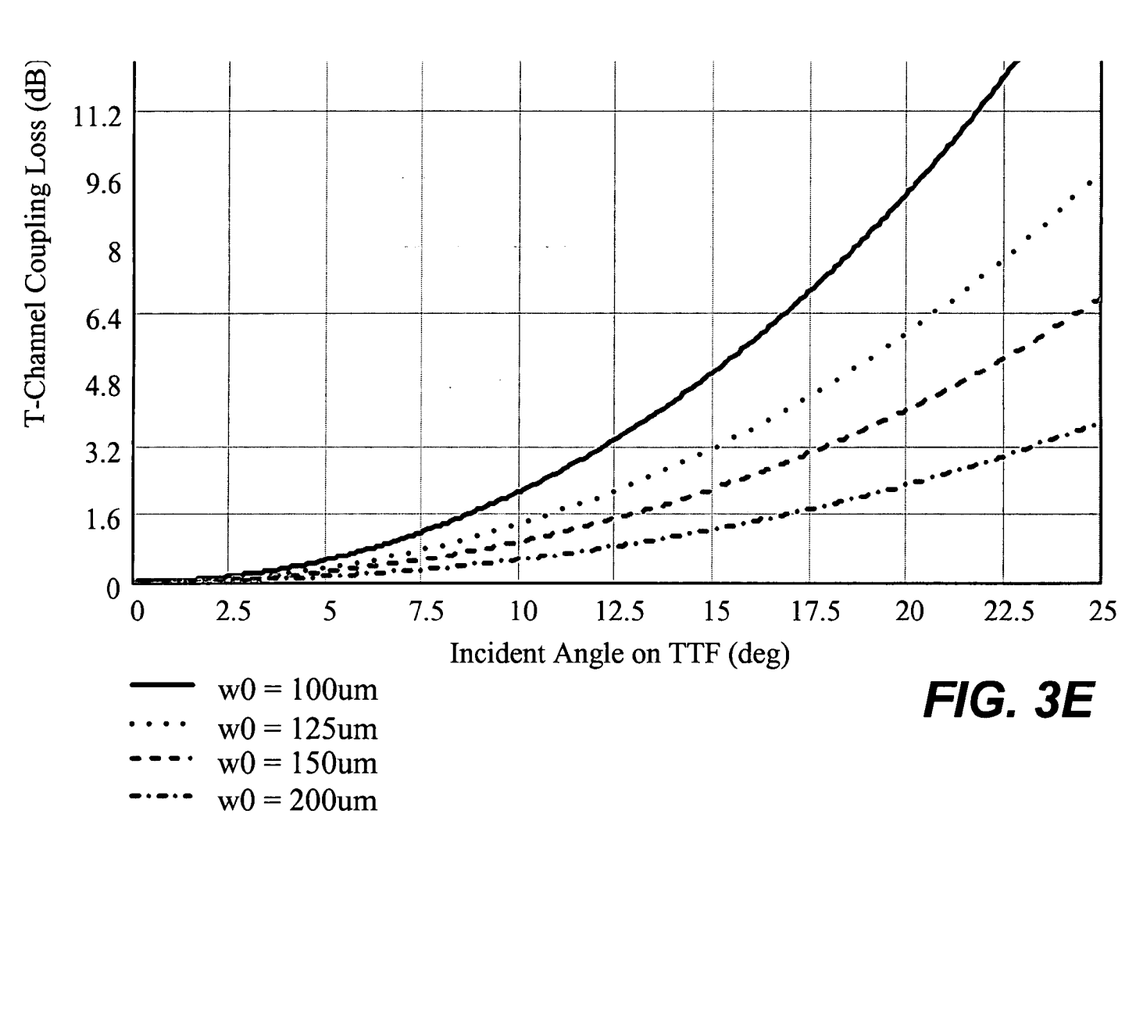
FIG. 3E shows the T-channel (transmission) coupling loss as a function of the tilting angle of the filter mirror assembly, for a fixed 1.2 mm thickness substrate with an index of refraction value 1.5 at various beam waist radii.

According to one embodiment of the present invention, FIG. 3A shows an optical device 300 that may be readily understood if viewed in conjunction with FIGS. 1A–2. It is assumed that the device 300 is used to drop a selected wavelength $\lambda_j$. Accordingly, the device 300 includes a filter mirror assembly 302 and a compensator 304 in addition to three collimators 306, 308 and 310 that are respectively labeled as input port collimator, express port collimator and transmission port.

In one embodiment, the filter mirror assembly 302 is similar to that in FIG. 1A and appears an "L" shape and provides a filtering function as well as a reflecting function. The filtering function is provided by, for example, a thin film filter 312 on top of a substrate 314, and the reflecting function may be simply provided by a mirror 316. As described above, when the filter mirror assembly 302 is controlled at a certain angle, only one selected wavelength $\lambda_j$ in a light beam can pass through the thin film filter 312 and the substrate 314 to the transmission port collimator. The rest of the light beam with wavelengths other than the selected wavelength $\lambda_j$ is reflected towards the mirror 316.

The mirror 316 then redirects the beam to the direction that is parallel to the optical path of the input beam (or the input beam direction) to the express (or reflection) port 308. One of the features of the device 300 is that the optical path of the reflected beam (or the reflected beam position) is always maintained as the same beam position of the incident beam while the filter mirror assembly 302 is controllably rotated around the rotation pivot 318. When the angle in the filter mirror assemble 302 is other than 90 degrees, as detailed below, the incidental beam position and the reflected beam position remains unaltered, although not necessarily being parallel. In any case, it can be shown in FIG. 3A that the separation between the incident beam position and the reflected beam position is always 2D, where D is the vertical distance between the rotation axis 318 to the incident beam position. Exemplary real tray tracing at three beam incident angles are shown schematically in FIG. 3B in which the reflected beam and the incident beam are kept the same position when the filter mirror assembly is rotated from 20 to 30 and to 40 degree.

It may be observed in FIG. 1A or FIG. 3 that, as the light beam at the selected wavelength $\lambda_j$ passes the filter mirror assembly 302, there is a certain lateral shift, noted as $\Delta x$, of the transmitted light with respect to the incident beam position. Such lateral shift $\Delta x$, observable in FIG. 1A or FIG. 3A, is largely caused by the difference between the two media. The magnitude of the lateral shift $\Delta x$ depends on the combination of the thickness of the thin film filter 312 and the index of the substrate 314. A measurement of such lateral shift versus an incident angle onto the filter mirror assembly 302 is shown in FIG. 3C.

In operation, such lateral shift $\Delta x$, depending on the magnitude thereof, ultimately affects the transmission of the light beam at the selected wavelength $\lambda_j$, thus introducing a coupling loss. Measurements of the coupling loss versus the lateral shift $\Delta x$ for four given collimated beam size on the transmission port coupling loss are collectively shown in FIG. 3D. Combining these two effects together, the T-channel (transmission) coupling loss as a function of the tilting angle of the filter mirror assembly, for a fixed 1.2 mm thickness substrate with an index of refraction value 1.5, at various beam waist radii are plotted in FIG. 3E.

One of the important features in the present invention is the introduction of the compensator 304 in the device 300. The compensator 304 is made as identical as possible to the substrate 314 such that the lateral shift $\Delta x$ can be cancelled or minimized when the light beam at the selected wavelength $\lambda_j$ passes the compensator 304. In operation, the shifted light beam enters the compensator 304 and is shifted in a direction opposite to that of the substrate 314, thus resulting in a cancellation of the lateral shift $\Delta x$ or at least a minimization of the lateral shift $\Delta x$. As a result, the coupling loss is significantly reduced.

It can be readily appreciated that the above description equally applied to the applications in which a signal at a specific wavelength (e.g., $\lambda_j$) is to be combined with an incoming signal by reversing the optical paths. A resultant newly combined or multiplexed signal will be output from the collimator 306.

Figure 4:
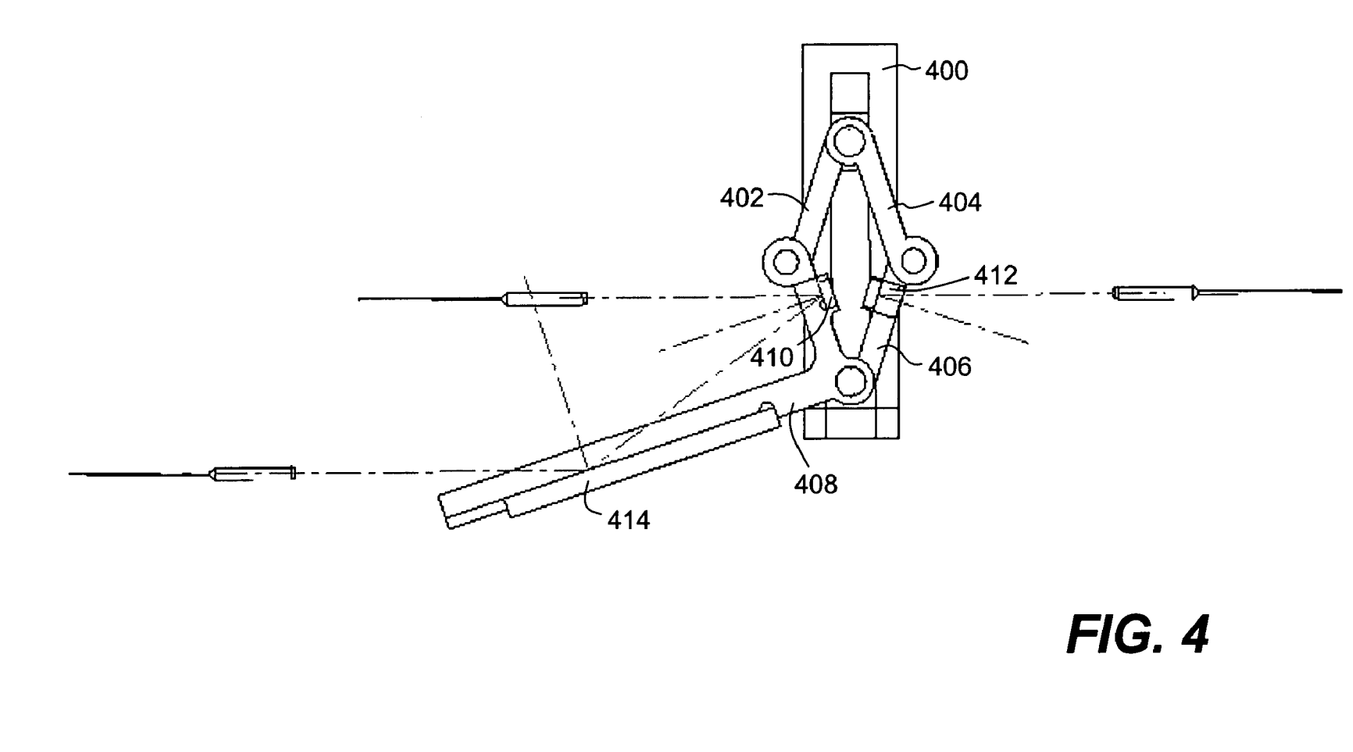
FIG. 4 shows an exemplary mechanical structure that may be used to control the rotation of the filter mirror assemble as well as the compensator as shown in FIG. 3A.

FIG. 4 shows an exemplary mechanical structure 400 that may be used to control the rotation of the filter mirror assemble as well as the compensator as shown in FIG. 3A. The mechanical structure 400 includes four rigid arms 402, 404, 406 and 408 connected at its ends to form a frame, wherein both of the arms 406 and 408 are attached a filter 410 and a compensator 412. The arm 408 is also extended to include a mirror 414 and thus provides an exemplary filter mirror assembly. In operation, to drop or filter out a selected wavelength, the filter mirror assembly is caused to rotate to a position where the spectral response of the filter 410 falls on the selected wavelength. As the arm 414 rotates, because of the framing of the mechanical structure 400, the compensator 412 moves oppositely with the filter 410.

One of the features in the present invention is that the reflected signal always maintains the same beam position regardless how the incident angle to the optical filter 410 is changed, as long as the rotation of the filter mirror assembly is around the rotation axis which is located at the intersection of the mirror and filter coating surface of the filter.

Figure 5A:
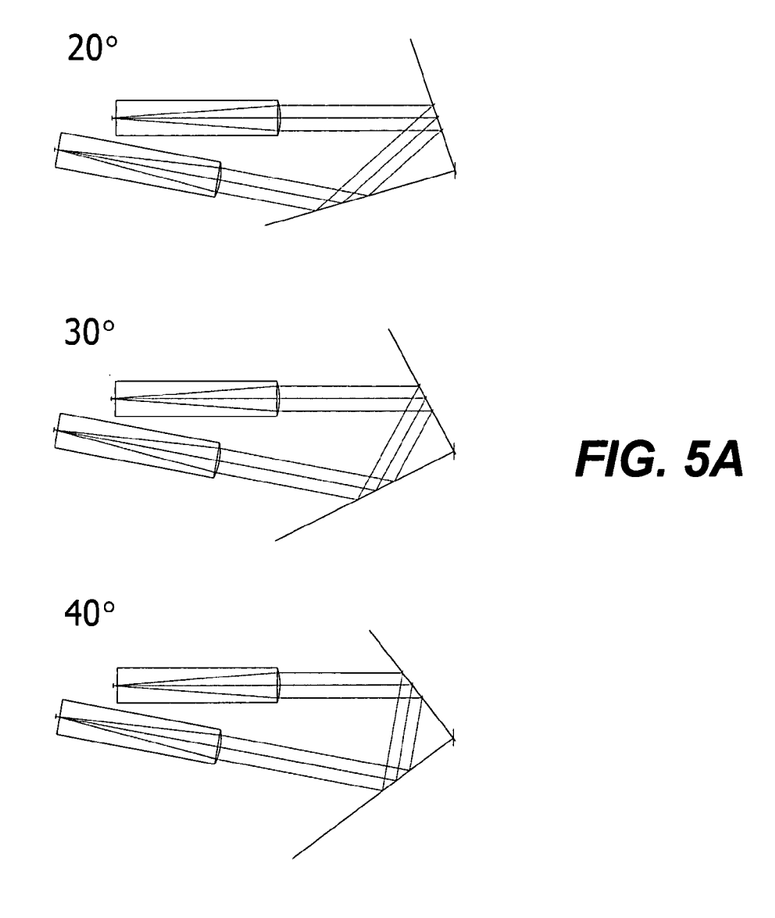
FIG. 5A shows a different configuration of the filter mirror assembly in which the angle between the thin film filter and the mirror is less than a right angle, for example 85 degree.

FIG. 5A shows a different configuration of the filter mirror assembly in which the angle between the thin film filter and the mirror is less than a right angle, for example 85 degree. It shows by ray tracing that as long as the filter mirror assembly rotates about the rotation pivot, the incident light path and the reflection light path will remain unaltered. It can be appreciated that the filter mirror assembly of FIG. 5A can be still supported by the mechanical structure 400 of FIG. 4.

There are some results observed. For the reflection port, for example, 308 of FIG. 3, the angle between the filter surface and the reflection mirror surface does not have to be 90° and the incident and reflection optical paths can still maintain unchanged while rotating the filter mirror assembly. This feature has been demonstrated in FIG. 5A in which the reflection port collimator is no longer parallel to the input port collimator while the light coupling is kept at optimal condition.

Figure 5B:
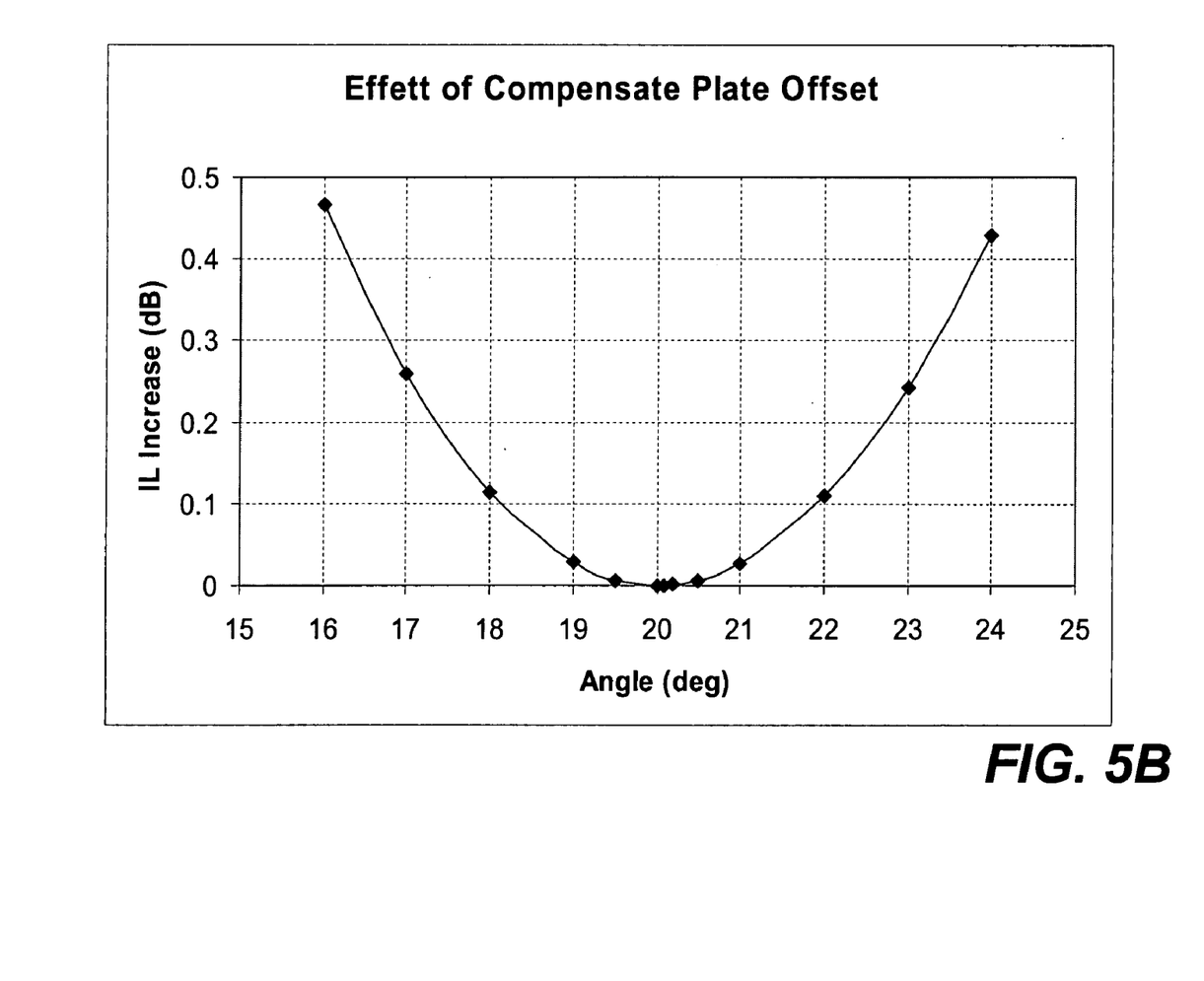
FIG. 5B shows an exemplary situation in which an optical compensator is not positioned perfectly systemic to a filter mirror assembly about a vertical bisector line, resulting in a two-degree offset in angle causes 0.1 dB insertion loss increase at 20° incident angle.

For the transmission port, for example, 310 of FIG. 3A, if the compensator 304 is not positioned perfectly systemic to the filter mirror assembly about a vertical bisector line 320, the situation is modeled and shown in FIG. 5B, a two-degree offset in angle causes 0.1 dB insertion loss increase at 20° incident angle. In operation and mechanically, such angle offset can easily be controlled under 2 degree.

The present invention has been described in sufficient details with a certain degree of particularity. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the foregoing description of embodiments.

We claim:

1. An optical device comprising:
    an optical filter having an incident side, a frequency response of the optical filter to an incoming signal depending on an incident angle of the incoming signal to the incident side;
    a mirror having a reflecting side and integrated with the optical filter to form an integrated part rotatably mounted on a rotation axis such that the mirror rotates accordingly when the optical filter is caused to rotate to a position in response to a selected wavelength; and
    a compensator configured to rotate oppositely with the optical filter to compensate a lateral shift in a light beam passing through the optical filter.

2. The optical device as recited in claim 1, wherein the frequency response is a bandpass centered at a wavelength in accordance with the incident angle.

3. The optical device as recited in claim 1, wherein the rotation axis is positioned at an intersection of the incident side of the optical filter and the reflecting side of the mirror.

4. The optical device as recited in claim 1, wherein the optical filter includes a filtering material on top of a substrate.

5. The optical device as recited in claim 4, wherein the compensator is substantially similar to the substrate.

6. The optical device as recited in claim 4, wherein the compensator and the substrate are framed in a rigid mechanical structure.

7. The optical device as recited in claim 1, further comprising at least a first collimator and a second collimator, wherein an rotation of the integrated part does not change respective optical paths between the first collimator and the optical filter as well as the second collimator and the mirror.

8. The optical device as recited in claim 7, further comprising a transmission port collimator, and wherein the first collimator is an input port collimator and the second collimator is an express port collimator, the input port collimator receives an incoming signal having N respective wavelengths $\lambda_1 \lambda_2 \ldots \lambda_N$, the express port collimator receiving reflected signal having N-1 respective wavelengths from the mirror while a selected wavelength from the N respective wavelengths $\lambda_1 \lambda_2 \ldots \lambda_N$ passes through the optical filter, is corrected by the compensator and comes out from the transmission port collimator.

9. The optical device as recited in claim 7, further comprising a third collimator receiving an add light beam with a selected wavelength, the add light beam, when going through the compensator, being shifted by a lateral distance that is subsequently cancelled or minimized by the optical filter when going through the optical filter.

10. The optical device as recited in claim 9, wherein the add light beam, after the optical filter, is combined with another light beam with N-1 wavelengths coming from the first collimator, a combined light now with N wavelengths is reflected by the mirror to the second collimator.

11. An optical device comprising:
    a filter mirror assembly including an optical filter having an incident side, a frequency response of the optical filter to an incoming signal depending on an incident angle of the incoming signal to the incident side and a mirror having a reflecting side, the filter mirror assembly rotatably mounted on a rotation axis such that the mirror rotates accordingly when the optical filter is caused to rotate to a position to select a wavelength;
    a first collimator optically coupled to the optical filter;
    a second collimator optically coupled to the mirror;
    a third collimator; and
    a compensator optically coupled between the filter mirror assembly and the third collimator, wherein the compensator performs in accordance with the optical filter to cancel or minimize a lateral shift when a light beam goes through either one of the compensator and the optical filter.

12. The optical device as recited in claim 11, wherein the first collimator couples the incoming signal having N respective wavelengths $\lambda_1 \lambda_2 \ldots \lambda_N$ to the optical filter that transmits a wavelength $\lambda_j$ out of the wavelengths $\lambda_1 \lambda_2 \ldots \lambda_N$, and reflects a reflected signal having all of the wavelengths $\lambda_1 \lambda_2 \ldots \lambda_N$ except for the wavelength $\lambda_j$ to the mirror that directs the reflected light to the second collimator.

13. The optical device as recited in claim 12, wherein a transmitted signal with the wavelength $\lambda_j$ further passes through the compensator and subsequently is out from the third collimator.

14. The optical device as recited in claim 13, wherein the transmitted signal is by the lateral shift when going through the optical filter, the lateral shift in the transmitted signal is cancelled or minimized by the compensator when the transmitted signal further passes through the compensator.

15. The optical device as recited in claim 11, wherein the third collimator couples an add signal with a wavelength $\lambda_j$ to the compensator that introduces the lateral shift to the added signal, the lateral shift is cancelled or minimized when the add signal goes through the optical filter.

16. The optical device as recited in claim 15, wherein the first collimator couples in an incoming signal having N-1 respective wavelengths $\lambda_1 \lambda_2 \ldots \lambda_N$ except for the wavelength $\lambda_j$, the incoming signal being combined with the add signal to produce a combined signal with all of the wavelengths $\lambda_1 \lambda_2 \ldots \lambda_N$, the combined signal reflected to the mirror that directs the combined signal to the third collimator.

17. The optical device as recited in claim 11, wherein the rotation axis is positioned at an intersection of the incident side of the optical filter and the reflecting side of the mirror.

18. The optical device as recited in claim 17, wherein an angle between the incident side of the optical filter and the reflecting side of the mirror is not necessarily to be a right angle.

* * * * *